(12) United States Patent
Hattori et al.

(10) Patent No.: US 10,996,084 B2
(45) Date of Patent: May 4, 2021

(54) RESIN DECORATIVE PART AND DIAL PLATE

(71) Applicant: Yazaki Corporation, Tokyo (JP)

(72) Inventors: Tatsuya Hattori, Shizuoka (JP); Teruomi Sano, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 349 days.

(21) Appl. No.: 16/558,008

(22) Filed: Aug. 30, 2019

(65) Prior Publication Data
US 2020/0166387 A1    May 28, 2020

(30) Foreign Application Priority Data
Sep. 7, 2018 (JP) .............................. JP2018-168097

(51) Int. Cl.
*G01D 13/04* (2006.01)
*B60K 35/00* (2006.01)

(52) U.S. Cl.
CPC ............. *G01D 13/04* (2013.01); *B60K 35/00* (2013.01)

(58) Field of Classification Search
CPC ................................ G01D 13/04; B60K 35/00
See application file for complete search history.

(56) References Cited

U.S. PATENT DOCUMENTS

| 9,739,648 B2 | 8/2017 | Takeda | |
| 10,828,850 B2* | 11/2020 | Matsumoto | B32B 7/12 |
| 2005/0142430 A1* | 6/2005 | Yoshida | H01M 4/8605 |
| | | | 429/481 |
| 2015/0136015 A1 | 5/2015 | Takeda | |
| 2017/0157804 A1* | 6/2017 | Takemoto | B29C 37/0028 |

FOREIGN PATENT DOCUMENTS

| JP | 2001-113894 A | 4/2001 |
| JP | 2010-271052 A | 12/2010 |
| JP | 2015-99084 A | 5/2015 |
| JP | 2017-102016 A | 6/2017 |

* cited by examiner

*Primary Examiner* — Anne M Hines
(74) *Attorney, Agent, or Firm* — Kenealy Vaidya LLP

(57) ABSTRACT

In a resin decorative part, a clear decoration has a body transmitting light and includes a carbon-toned surface provided on the opposite side to the viewer side of the body and having a carbon-toned pattern. The carbon color layer is colored in a carbon color, is laminated on the carbon-toned surface, and has a reflective surface reflecting light transmitted through the clear decoration. The carbon-toned pattern is formed with a plurality of pseudo carbon fiber bundles presenting carbon fiber bundles formed by bundling carbon fibers in a pseudo manner. The pseudo carbon fiber bundle has a plurality of linear grooves that constitute pseudo carbon fibers presenting carbon fibers in a pseudo manner. The carbon-toned surface includes a pseudo carbon fiber bundle in which the length in the extending direction of each linear groove and the depth of the linear groove vary in a predetermined range.

14 Claims, 10 Drawing Sheets

FIG.9

|  | EVALUATOR A | EVALUATOR B | EVALUATOR C |
|---|---|---|---|
| LENGTH Q 4 mm | × | × | × |
| LENGTH Q 10 mm | × | × | × |
| LENGTH Q 40 mm | × | × | × |
| LENGTH Q 5 mm TO 10 mm | △ | ○ | × |
| LENGTH Q 1 mm TO 15 mm | ○ | ○ | ○ |

FIG.13

|  | EVALUATOR A | EVALUATOR B | EVALUATOR C |
|---|---|---|---|
| LENGTH Q 4 mm | × | × | × |
| LENGTH Q 10 mm | × | × | × |
| LENGTH Q 40 mm | × | × | × |
| LENGTH Q 5 mm TO 10 mm | △ | ○ | × |
| LENGTH Q 1 mm TO 15 mm | ○ | ○ | ○ |

RESIN DECORATIVE PART AND DIAL PLATE

CROSS-REFERENCE TO RELATED APPLICATION(S)

The present application claims priority to and incorporates by reference the entire contents of Japanese Patent Application No. 2018-168097 filed in Japan on Sep. 7, 2018.

BACKGROUND OF THE INVENTION

1. Field of the Invention

The present invention relates to a resin decorative part and a dial plate.

2. Description of the Related Art

Conventionally, Japanese Patent Application Laid-open No. 2017-102016 discloses, as an example of dials, an instrument dial plate that displays a vehicle speed and the like in a visible manner. This instrument dial plate includes a light-transmitting substrate, a clear layer provided on the viewer side of the substrate to present protrusions and depressions of a carbon surface in a pseudo manner, and a print layer provided on the opposite side to the viewer side of the substrate to present a carbon-toned pattern. The instrument dial plate uses a clear layer to present a carbon surface in a pseudo manner and thereby improves the texture of the carbon-toned decoration.

It has been desired, for example, to further improve the texture of the carbon-toned decoration in the instrument dial plate disclosed in Japanese Patent Application Laid-open No. 2017-102016.

SUMMARY OF THE INVENTION

The present invention is then made in view of the foregoing and aims to provide a resin decorative part and a dial plate that can appropriately ensure the texture of the carbon-toned decoration.

In order to solve the above mentioned problem and achieve the object, a resin decorative part according to one aspect of the present invention includes a clear decoration having a body transmitting light, the clear decoration including a carbon-toned surface disposed on an opposite side to a viewer side of the body and having a carbon-toned pattern; and a carbon color layer colored in a carbon color and laminated on the carbon-toned surface, the carbon color layer having a reflective surface reflecting light transmitted through the clear decoration, wherein the carbon-toned pattern is formed with a plurality of pseudo carbon fiber bundles presenting carbon fiber bundles formed by bundling carbon fibers in a pseudo manner, the pseudo carbon fiber bundle has a plurality of linear grooves that constitute pseudo carbon fibers presenting the carbon fibers in a pseudo manner, and the carbon-toned surface includes the pseudo carbon fiber bundle in which a length in an extending direction of each linear groove and a depth of the linear groove vary in a predetermined range.

According to another aspect of the present invention, in the resin decorative part, it is preferable that the carbon-toned surface includes a plurality of unit patterns that constitute a weave of the pseudo carbon fiber bundles, and the unit patterns include the unit pattern in which a length in an extending direction of each linear groove and a depth of the linear groove vary in a predetermined range.

According to still another aspect of the present invention, in the resin decorative part, it is preferable that the unit patterns are formed such that a length in a long side direction is 4 mm and a length in a short side direction is 2 mm, and the linear grooves are formed such that a length in an extending direction of each linear groove is in a range of 1 mm to 4 mm and a depth of the linear groove is in a range of 0 μm to 3 μm at random.

According to still another aspect of the present invention, in the resin decorative part, it is preferable that the linear groove is formed to be depressed from a reference plane of the carbon-toned surface along a deepness direction, and a depth of the linear groove is a distance between the reference plane and a bottom portion of the linear groove in the deepness direction.

In order to achieve the object, a dial plate according to still another aspect of the present invention includes a clear decoration having a body disposed in a vehicle and transmitting light, the clear decoration including a carbon-toned surface disposed on an opposite side to a viewer side of the body and having a carbon-toned pattern; a carbon color layer colored in a carbon color, laminated on the carbon-toned surface, and including a reflective surface reflecting light transmitted through the clear decoration; a low reflection layer laminated on the viewer side of the body to suppress reflection of light; and a design display section disposed on the body and transmitting light such that a design related to the vehicle is illuminated, wherein the carbon-toned pattern is formed with a plurality of pseudo carbon fiber bundles presenting carbon fiber bundles formed by bundling carbon fibers in a pseudo manner, the pseudo carbon fiber bundle has a plurality of linear grooves that constitute pseudo carbon fibers presenting the carbon fibers in a pseudo manner, and the carbon-toned surface includes the pseudo carbon fiber bundle in which a length in an extending direction of each linear groove and a depth of the linear groove vary in a predetermined range.

In order to achieve the object, a resin decorative part according to still another aspect of the present invention includes a clear decoration having a body transmitting light, the clear decoration including a carbon-toned surface disposed on a viewer side of the body and having a carbon-toned pattern; and a colored layer laminated on an opposite side to the viewer side of the body and colored in a carbon color, wherein the carbon-toned pattern is formed with a plurality of pseudo carbon fiber bundles presenting carbon fiber bundles formed by bundling carbon fibers in a pseudo manner, the pseudo carbon fiber bundle has a plurality of linear protrusions that constitute pseudo carbon fibers presenting the carbon fibers in a pseudo manner, and the carbon-toned surface includes the pseudo carbon fiber bundle in which a length in an extending direction of each linear protrusion and a height of the linear protrusion vary in a predetermined range.

According to still another aspect of the present invention, in the resin decorative part, it is preferable that the carbon-toned surface includes a plurality of unit patterns that constitute a weave of the pseudo carbon fiber bundles, and the unit patterns include the unit pattern in which a length in an extending direction of each linear protrusion and a height of the linear protrusion vary in a predetermined range.

According to still another aspect of the present invention, in the resin decorative part, it is preferable that the unit patterns are formed such that a length in a long side direction is 4 mm and a length in a short side direction is 2 mm, and the linear protrusions are formed such that a length in an extending direction of each linear protrusion is in a range of 1 mm to 4 mm and a height of the linear protrusion is in a range of 0 μm to 3 μm at random.

According to still another aspect of the present invention, in the resin decorative part, it is preferable that the linear protrusion is formed to protrude along a height direction from a reference plane of the carbon-toned surface, and a height of the linear protrusion is a distance between the reference plane and a top portion of the linear protrusion in the height direction.

In order to achieve the object, a dial plate according to still another aspect of the present invention includes a clear decoration having a body disposed in a vehicle and transmitting light, the clear decoration including a carbon-toned surface disposed on a viewer side of the body and having a carbon-toned pattern; a colored layer laminated on an opposite side to the viewer side of the body and colored in a carbon color; and a design display section disposed on the body and transmitting light such that a design related to the vehicle is illuminated, wherein the carbon-toned pattern is formed with a plurality of pseudo carbon fiber bundles presenting carbon fiber bundles formed by bundling carbon fibers in a pseudo manner, the pseudo carbon fiber bundle has a plurality of linear protrusions that constitute pseudo carbon fibers presenting the carbon fibers in a pseudo manner, and the carbon-toned surface includes the pseudo carbon fiber bundle in which a length in an extending direction of each linear protrusion and a height of the linear protrusion vary in a predetermined range.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a table illustrating the result of a sensory evaluation test of a carbon decorative panel according to the first embodiment;

FIG. 13 is a table illustrating the result of a sensory evaluation test of a carbon decorative panel according to the second embodiment.

DETAILED DESCRIPTION OF THE PREFERRED EMBODIMENTS

Modes for carrying out the present invention (embodiments) will be described in detail with reference to the drawings. The present invention is not limited by the description of embodiments below. The components described below include those easily conceived by those skilled in the art and those substantially equivalent. The configurations described below can be combined as appropriate. The configurations are susceptible to a variety of omission, substitution, and modification without departing from the spirit of the invention.

First Embodiment

Figure 1:
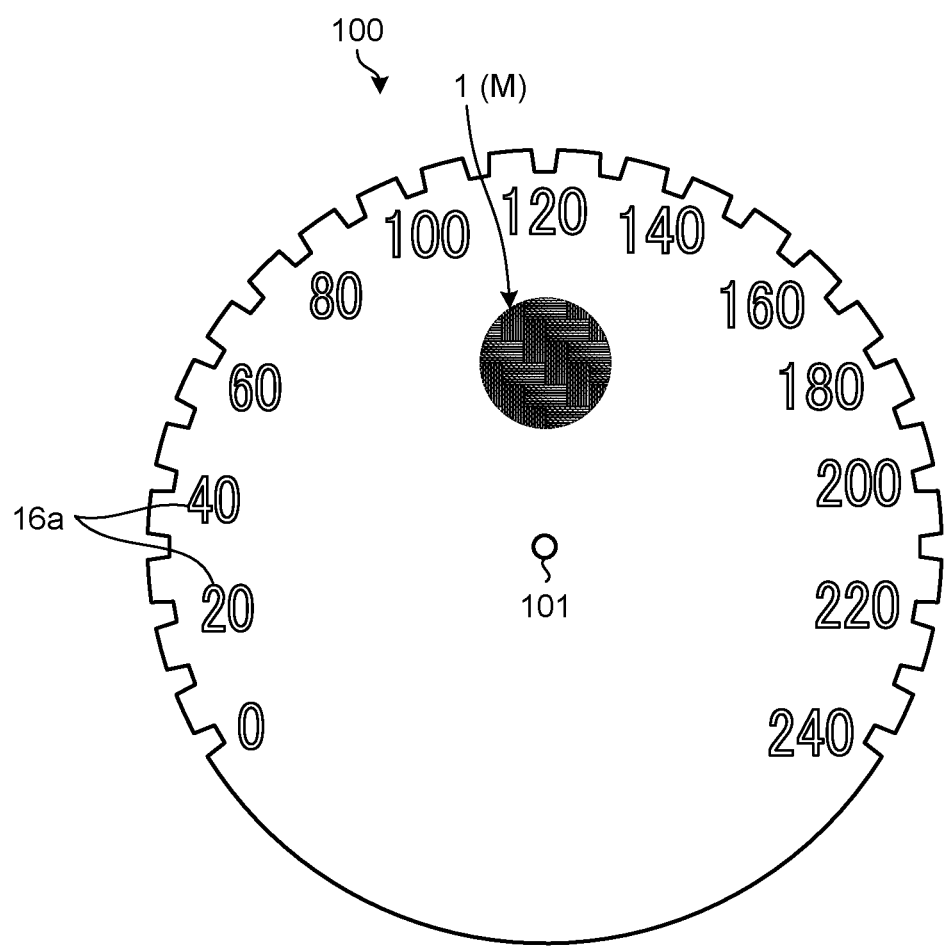
FIG. 1 is a front view illustrating a configuration example of a dial plate according to a first embodiment.
Figure 2:
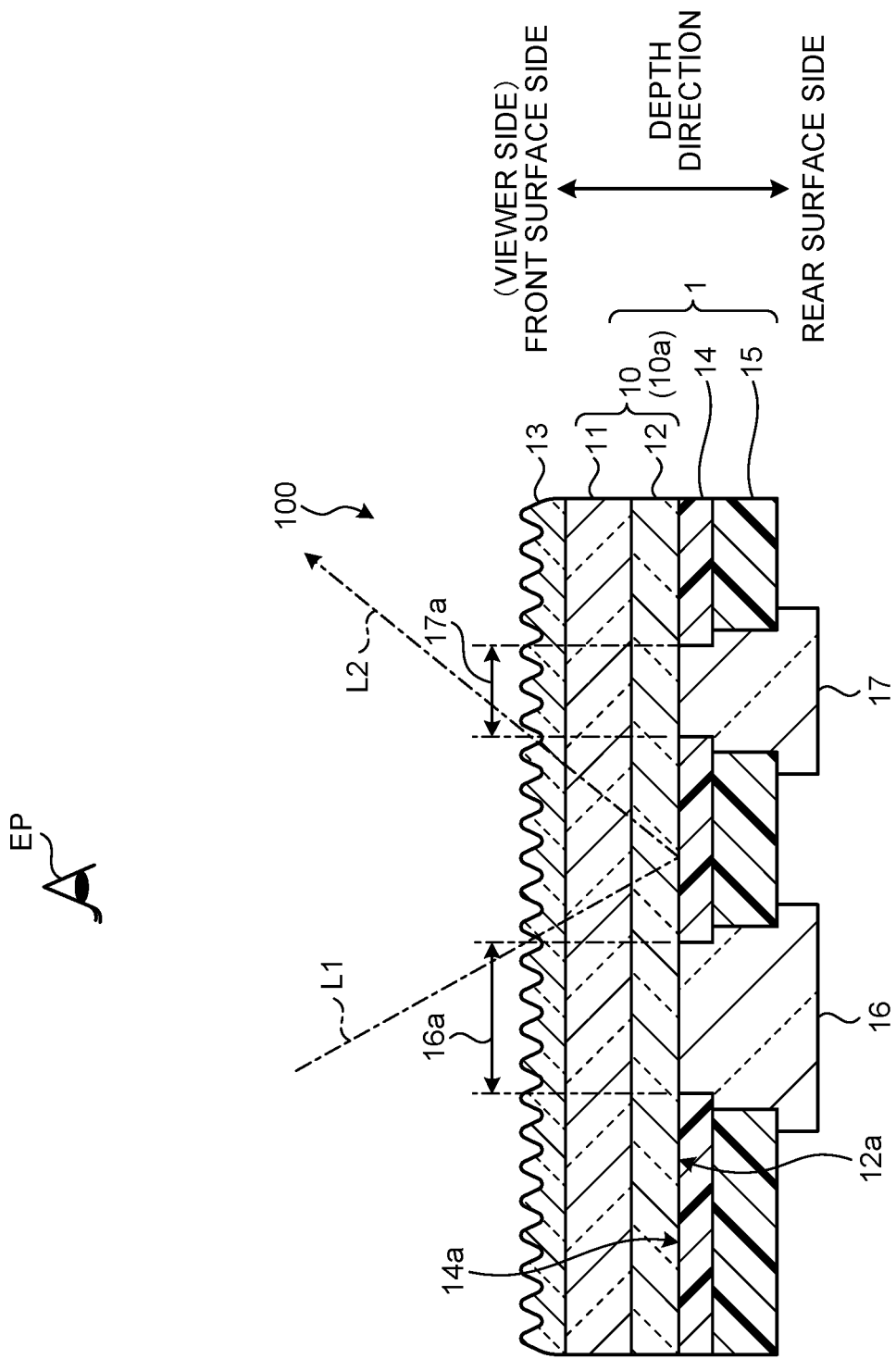
FIG. 2 is a cross-sectional view illustrating a configuration example of the dial plate according to the first embodiment.
Figure 3:
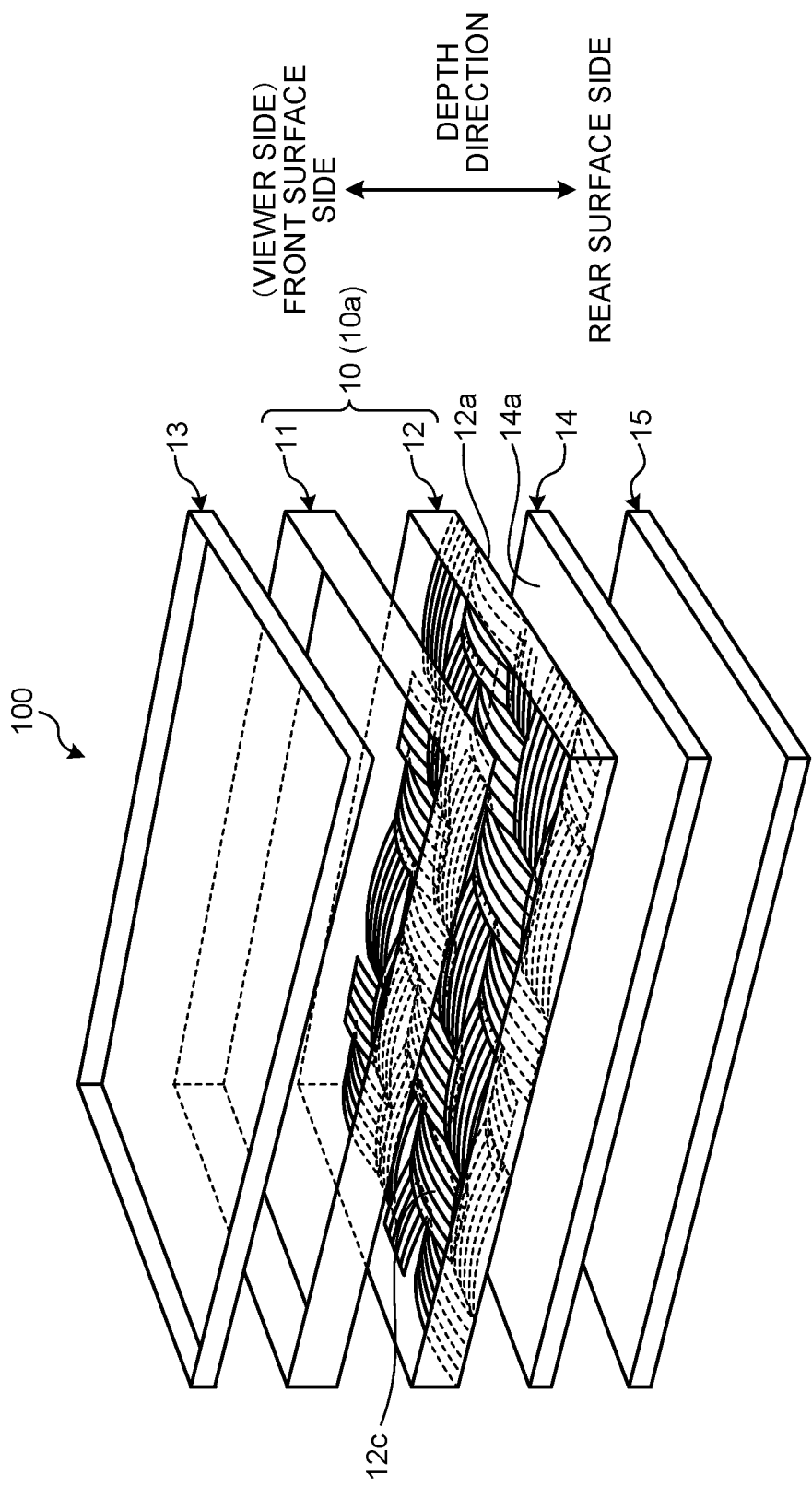
FIG. 3 is an exploded perspective view illustrating a configuration example of the dial plate according to the first embodiment.
Figure 4:
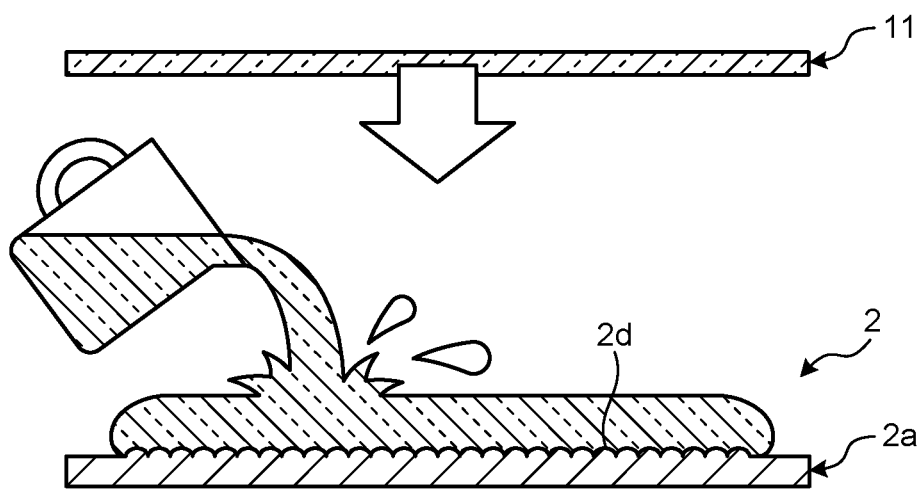
FIG. 4 is a side view illustrating a first step of imprinting in the dial plate according to the first embodiment.
Figure 5:
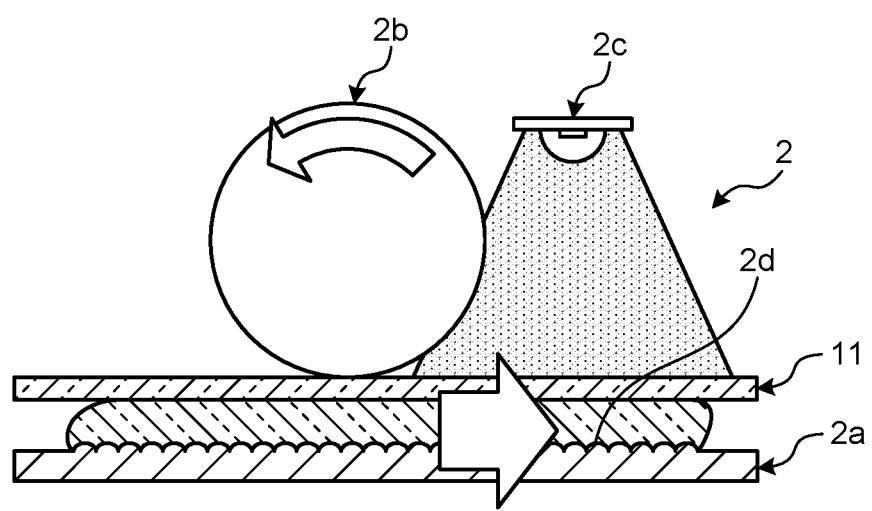
FIG. 5 is a side view illustrating a second step of imprinting in the dial plate according to the first embodiment.
Figure 6:
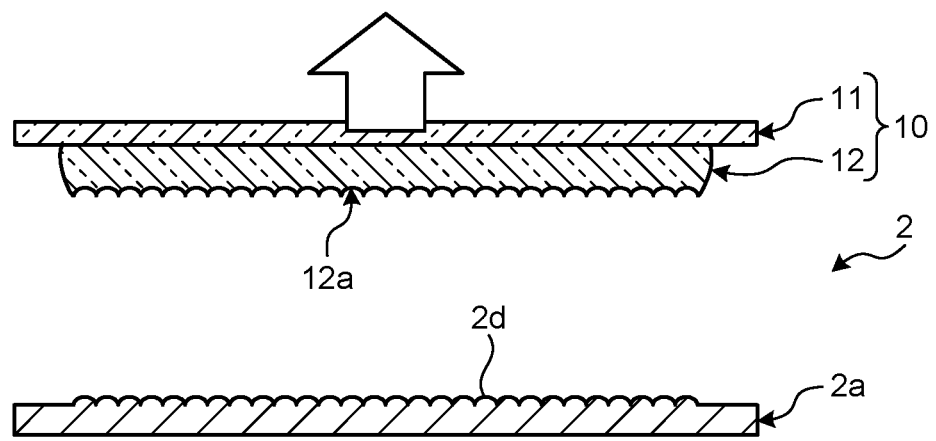
FIG. 6 is a side view illustrating a third step of imprinting in the dial plate according to the first embodiment.
Figure 7:
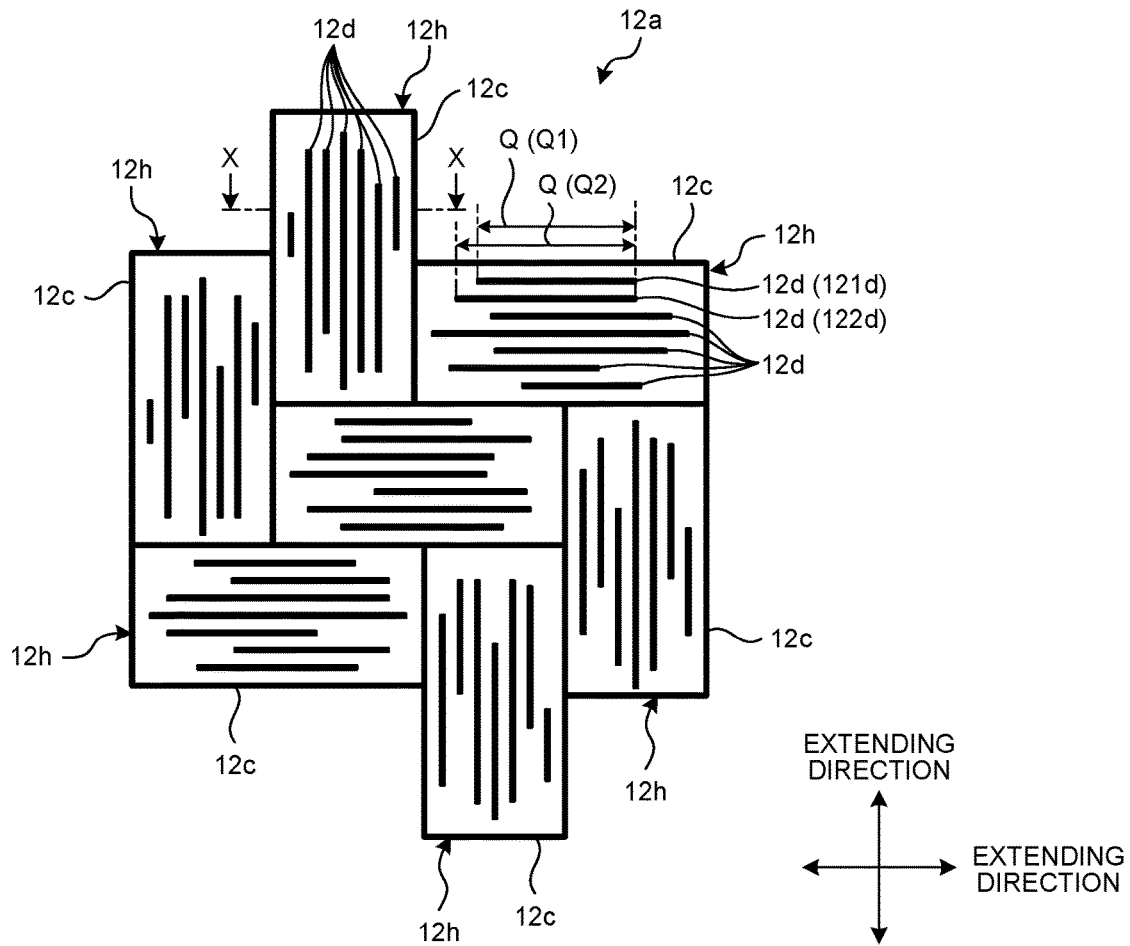
FIG. 7 is a front view illustrating a configuration example of a carbon-toned surface of a clear layer according to the first embodiment.
Figure 8:
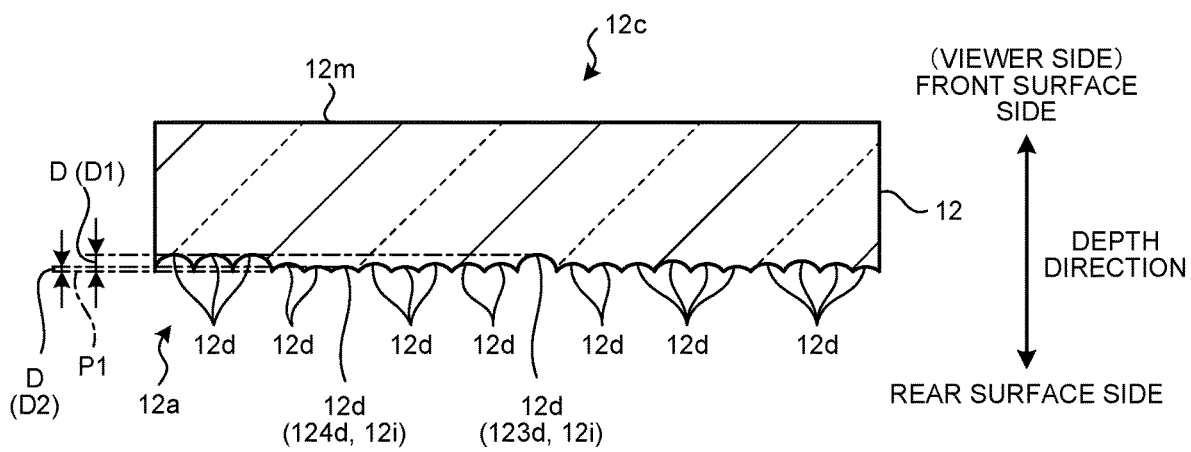
FIG. 8 is a cross-sectional view along X-X in FIG. 7.

A carbon decorative panel (resin decorative part) 1 and a dial plate 100 according to a first embodiment will be described. FIG. 1 is a front view illustrating a configuration example of the dial plate 100 according to the first embodiment. FIG. 2 is a cross-sectional view illustrating a configuration example of the dial plate 100 according to the first embodiment. FIG. 3 is an exploded perspective view illustrating a configuration example of the dial plate 100 according to the first embodiment. FIG. 3 schematically illustrates the features of the layered structure of the dial plate 100. FIG. 4 is a side view illustrating a first step of imprinting in the dial plate 100 according to the first embodiment. FIG. 5 is a side view illustrating a second step of imprinting in the dial plate 100 according to the first embodiment. FIG. 6 is a side view illustrating a third step of imprinting in the dial plate 100 according to the first embodiment. FIG. 7 is a front view illustrating a configuration example of a carbon-toned surface 12a of a clear layer 12 according to the first embodiment in the exaggerated way. FIG. 8 is a cross-sectional view along X-X in FIG. 7.

As illustrated in FIG. 1, a carbon decorative panel 1 is applied to the dial plate 100 as a resin decorative part having a carbon-toned pattern M. The dial plate 100 is applied to a vehicle indicator (not illustrated) mounted on a vehicle. The vehicle indicator constitutes a vehicle-mounted meter and, for example, is mounted on an instrument panel provided in the dashboard of a vehicle to display a variety of information related to the vehicle as information available for driving the vehicle.

The dial plate 100 is, for example, a dial plate for a speedometer and formed as a circular flat plate. The dial plate 100 has a through hole 101 at the center, in which a not-illustrated pointer is inserted. The dial plate 100 has a plurality of character display sections (design display sections) 16a in the circumferential direction near the outer periphery to show the speed. For example, each character display section 16a emits light radiating from a light source (not illustrated) arranged in the dial plate 100 on the opposite side to the viewer side viewed by the driver, to the viewer side. The driver then can recognize a character in the character display section 16a that shows the vehicle speed in the dial plate 100. Although FIG. 1 partially illustrates the carbon-toned pattern M, the carbon-toned pattern M is provided, for example, in a region excluding the regions of the character display sections 16a.

As used herein the depth direction of the dial plate 100 typically corresponds to the front-back direction of the vehicle to which the dial plate 100 is applied. The front surface side of the dial plate 100 is the side facing the driver's seat of the vehicle and typically the viewer side viewed by the driver sitting in the driver's seat, that is, the driver's eyepoint EP side. By contrast, the rear surface side of the dial plate 100 is the opposite side to the front surface side in the depth direction and typically the side accommodated in the inside of the instrument panel.

As illustrated in FIG. 2, the dial plate 100 includes a carbon decorative panel 1, an anti-glare (AG) print layer 13 as a low reflection layer, a design layer 16, and a smoke layer 17. The carbon decorative panel 1 includes a clear decoration 10, a carbon color layer 14, and a light-blocking print layer 15. As illustrated in FIG. 3, in the dial plate 100, the AG print layer 13, the clear decoration 10, the carbon color layer 14, and the light-blocking print layer 15 are layered in this order from the front surface side to the rear surface side in the depth direction.

The clear decoration 10 has a body 10a that transmits light of wavelengths in the visible light range. The body 10a includes a substrate 11 and a clear layer 12. The substrate 11 serves as the base of the dial plate 100. The substrate 11 is formed of, for example, a resin material such as acrylic resin and polycarbonate that transmits light of wavelengths in the visible light range. The substrate 11 is formed by shaping a resin material into a desired flat plate shape, for example, using a mold.

The clear layer 12 has the carbon-toned pattern M. The clear layer 12 is provided by imprinting described later on the opposite side to the viewer side of the substrate 11, that is, on the rear surface side of the substrate 11. The clear layer 12 is formed of, for example, a photocurable resin material (ink) that transmits light of wavelengths in the visible light range and is cured when irradiated with ultraviolet (UV) light. As illustrated in FIG. 2, the clear layer 12 includes a carbon-toned surface 12a. The carbon-toned surface 12a is provided on the clear layer 12 on the opposite side to the substrate 11 and formed to be flat. The carbon-toned surface 12a has the carbon-toned pattern M formed with a plurality of unit patterns 12c (see FIG. 7). Each unit pattern 12c is formed, for example, in a rectangular parallelepiped shape and constitutes a weave of pseudo carbon fiber bundles 12h presenting actual pre-impregnated carbon fiber bundles in a pseudo manner. In each unit pattern 12c, each individual pseudo carbon fiber presenting an actual carbon fiber in a pseudo manner is formed. The carbon-toned pattern M is formed with a plurality of pseudo carbon fiber bundles 12h presenting carbon fiber bundles formed by bundling actual carbon fibers in a pseudo manner. Pre-impregnation refers to the woven actual carbon fibers impregnated with resin and cured. The configuration of the pseudo carbon fiber bundle 12h will be described later.

The AG print layer 13 suppresses reflection of light. The AG print layer 13 is laminated on the viewer side of the substrate 11 and provided over the entire surface of the substrate 11. The AG print layer 13 is formed, for example, by screen printing on the viewer side of the substrate 11. The AG print layer 13 has minute protrusions and depressions on the viewer side of the substrate 11. The AG print layer 13 diffuses incident light L1 incident from the viewer side on the minute protrusions and depressions to suppress regular reflection of incident light L1 on the surface of the substrate 11 on the viewer side.

The carbon color layer 14 is a colored layer colored in a carbon color. As used herein carbon color is, for example, black (carbon black). The carbon color layer 14 is laminated on the clear layer 12 on the carbon-toned surface 12a side. The carbon color layer 14 is formed, for example, by printing ink of a resin material on the carbon-toned surface 12a. The carbon color layer 14 is formed, for example, by screen printing. For example, a screen printer prints ink colored in the carbon color on the carbon-toned surface 12a. The screen printer prints ink, for example, in the region excluding the region of the character display section 16a and the region of an indicator display section (design display section) 17a on the carbon-toned surface 12a. The carbon-toned pattern M thus does not appear in the region of the character display section 16a and the region of the indicator display section 17a.

The carbon color layer 14 includes a base material of a resin material colored in the carbon color and a bright material added to the base material and does not transmit light. The bright material has a refractive index different from that of the resin material of the clear layer 12 and has a gloss. The bright material includes, for example, aluminum, silver, or pearl. The carbon color layer 14 has a reflective surface 14a on the carbon-toned surface 12a side. The reflective surface 14a is provided in contact with the unit pattern 12c of the carbon-toned surface 12a and has the shape of the carbon-toned surface 12a. That is, the reflective surface 14a has the same shape as the shape of each unit pattern 12c of the carbon-toned surface 12a. In this way, in the reflective surface 14a, a weave of pseudo carbon fiber bundles 12h is formed as viewed from the viewer (eyepoint EP) side, and each individual pseudo carbon fiber is formed. The reflective surface 14a reflects incident light L1 transmitted through the clear decoration 10 toward the viewer side as reflected light L2.

The light-blocking print layer 15 is a light-blocking layer that blocks light. The light-blocking print layer 15 is laminated on the carbon color layer 14 on the opposite side to the viewer side. The light-blocking print layer 15 is formed, for example, by printing ink of a resin material on the carbon color layer 14. The light-blocking print layer 15 is formed, for example, using a screen printer. The screen printer prints ink colored in a light-blocking color on the rear surface side of the carbon color layer 14. The screen printer prints ink on the rear surface side of the carbon color layer 14, for example, in a region excluding the region of the character display section 16a and the region of the indicator display section 17a. The light-blocking print layer 15 blocks light incident from the opposite side (rear surface side) to the viewer side.

The design layer 16 forms the character display section 16a. The character display section 16a transmits light such that a design related to the vehicle is illuminated. The design layer 16 is laminated on the carbon-toned surface 12a side of the clear layer 12. The design layer 16 is formed, for example, by printing ink of a resin material in the region of the character display section 16a in the clear layer 12. The design layer 16 is formed, for example, using a screen printer. The screen printer prints translucent ink colored in a desired color in the region of the character display section 16a in the clear layer 12. The design layer 16 transmits light emitted from a light source (not illustrated) provided on the opposite side (rear surface side) to the viewer side and emits the transmitted light to the clear layer 12. The character display section 16a shows a vehicle speed in the dial plate 100 in a display manner in which the carbon-toned pattern M is not superimposed.

The smoke layer 17 forms the indicator display section 17a. The indicator display section 17a transmits light such that a design related to the vehicle is illuminated. The smoke layer 17 is laminated on the carbon-toned surface 12a side of the clear layer 12. The smoke layer 17 is formed, for example, by printing ink of a resin material in the region of the indicator display section 17a in the clear layer 12. The smoke layer 17 is formed, for example, using a screen printer. The screen printer prints ink colored in a light-reducing color in the region of the indicator display section 17a in the clear layer 12. The smoke layer 17 transmits light emitted from a light source (not illustrated) provided on the opposite side (rear surface side) to the viewer side and emits the transmitted light to the clear layer 12. The indicator display section 17a shows an indicator of the dial plate 100 in a display manner in which the carbon-toned pattern M is not superimposed.

Referring now to FIG. 4 to FIG. 6, the steps of imprinting in the dial plate 100 are described. The operator performs imprinting using an imprinting system 2. The imprinting system 2 includes a mold 2a, a roller 2b, and a UV metal-halide lamp 2c. The mold 2a has a plurality of protrusions and depressions 2d on its surface for forming the unit patterns 12c of the carbon-toned pattern M. As illustrated in FIG. 4, the operator first pours a liquid photocurable resin material (ink) onto the surface of the mold 2a with the protrusions and depressions 2d. As illustrated in FIG. 5, the operator then operates the imprinting system 2 to press the substrate 11 against the photocurable resin material poured on the surface of the mold 2a using the roller 2b while irradiating the photocurable resin material with UV light using the UV metal-halide lamp 2c to cure the photocurable resin material. As illustrated in FIG. 6, the operator then operates the imprinting system 2 to move the photocurable resin material (clear layer 12) laminated on the substrate 11 away from the mold 2a. The clear decoration 10 with the carbon-toned surface 12a thus can be formed.

As illustrated in FIG. 7 and FIG. 8, the pseudo carbon fiber bundle 12h of the carbon-toned surface 12a has a plurality of linear grooves 12d that constitute pseudo carbon fibers presenting actual carbon fibers in a pseudo manner. Each linear groove 12d extends along the extending direction of the pseudo carbon fiber bundle 12h. The linear groove 12d is formed to be depressed along the depth direction (deepness direction) from the reference plane P1 of the carbon-toned surface 12a. As used herein the reference plane P1 is a virtual plane on the rear surface side of the clear layer 12, for example, a plane parallel to the opposite surface 12m to the carbon-toned surface 12a. The reference plane P1 can be said as a plane orthogonal to the depth direction (layered direction). The reference plane P1 can be said as a plane along the row direction in which the linear grooves 12d are arranged in a row. The depth D of the linear groove 12d is the distance between the reference plane P1 and the bottom portion 12i of the linear groove 12d in the depth direction. The carbon-toned surface 12a includes the pseudo carbon fiber bundle 12h in which the length Q in the extending direction of the linear groove 12d and the depth D of the linear groove 12d vary in a predetermined range. In the first embodiment, it is assumed that the pseudo carbon fiber bundle 12h is a carbon fiber bundle formed by bundling 3000 actual carbon fibers (called 3K carbon fiber bundle).

In the unit patterns 12c that constitute a weave of pseudo carbon fiber bundles 12h, the length Q in the extending direction of the linear groove 12d and the depth D of the linear groove 12d vary for each unit pattern 12c in a predetermined range. In the case of the above-described 3K pseudo carbon fiber bundle 12h, the unit patterns 12c are formed such that the length in the long side direction is 4 mm and the length in the short side direction is 2 mm. In this case, each linear groove 12d is formed such that the length Q in the extending direction of the linear groove 12d is in the range of 1 mm to 4 mm and the depth D in the depth direction of the linear groove 12d is in the range of 0 µm to 3 µm at random. As used herein "at random" means that the length Q of the linear groove 12d and the depth D of the linear groove 12d are changed arbitrarily in a predetermined range. As illustrated in FIG. 7, the linear groove 12d is formed, for example, such that the length Q1 in the extending direction of a linear groove 121d is shorter than the length Q2 of the extending direction of a linear groove 122d. As illustrated in FIG. 8, the linear groove 12d is formed, for example, such that the depth D1 in the depth direction of a linear groove 123d is greater than the depth D2 in the depth direction of a linear groove 124d.

The result of a sensory evaluation test of the carbon decorative panel 1 will now be described. In the sensory evaluation test, as illustrated in FIG. 9, the carbon decorative panels 1 with varied lengths Q of the linear grooves 12d were prepared. Each carbon decorative panel 1 was evaluated by three evaluators A to C. The depth D of the linear groove 12d was set to 0 µm to 3 µm. The length Q of the linear groove 12d was set to 4 mm, 10 mm, 40 mm, 5 mm to 10 mm, and 1 mm to 15 mm in the 3K pseudo carbon fiber bundle 12h. Since the length (entire length) in the long side direction of the unit pattern 12c is 4 mm, for example, when the length Q of the linear groove 12d is set to 4 mm, one or a plurality of 4-mm linear grooves 12d are formed. In the unit pattern 12c, when the length Q is set to 10 mm, one or a plurality of sets of two 4-mm linear grooves 12d and one 2-mm linear groove 12d (linear groove 12d of a total of 10 mm) are formed. In the unit pattern 12c, when the length Q is set to 5 mm to 10 mm, the linear grooves 12d having the lengths Q set in the range of 5 mm to 10 mm at random are formed.

In FIG. 9, "x" indicates being not similar to actual carbon, "○" indicates being similar to actual carbon, and "Δ" indicates being slightly similar to actual carbon. As illustrated in FIG. 9, when the length Q of the linear groove 12d is 4 mm, 10 mm, and 40 mm, the evaluators A to C evaluated the panel as being not similar to actual carbon ("x"). When the length Q of the linear groove 12d is 5 mm to 10 mm, the evaluator A evaluated the panel as being slightly similar to actual carbon ("Δ"), the evaluator B evaluated the panel as being similar to actual carbon ("○"), and the evaluator C evaluated the panel as being not similar to actual carbon ("x"). When the length Q of the linear groove 12d is 1 mm to 15 mm, the evaluators A to C evaluated the panel as being similar to actual carbon ("○"). Based on this result, the carbon decorative panel 1 can be evaluated as being most similar to actual carbon when the length Q of the linear groove 12d is 1 mm to 15 mm.

As described above, the carbon decorative panel 1 according to the first embodiment includes the clear decoration 10 and the carbon color layer 14. The clear decoration 10 has the body 10a transmitting light and includes the carbon-toned surface 12a provided on the opposite side to the viewer side of the body 10a and having the carbon-toned pattern M. The carbon color layer 14 is colored in the carbon color, is laminated on the carbon-toned surface 12a, and has the reflective surface 14a reflecting light transmitted through the clear decoration 10. The carbon-toned pattern M is formed with the pseudo carbon fiber bundles 12h presenting carbon fiber bundles formed by bundling carbon fibers in a pseudo manner. The pseudo carbon fiber bundle 12h has the linear grooves 12d that constitute pseudo carbon fibers presenting carbon fibers in a pseudo manner. The carbon-toned surface 12a includes the pseudo carbon fiber bundle 12h in which the length Q in the extending direction of each linear groove 12d and the depth D of the linear groove 12d vary in a predetermined range.

In the carbon decorative panel 1 with this configuration, the length Q and the depth D of the linear groove 12d of the pseudo carbon fiber bundle 12h can be formed at random. The pseudo carbon fiber bundles 12h having irregularity that look as if actual carbon fiber bundles are woven by pre-impregnation thus can be formed in the carbon decorative panel 1. The carbon decorative panel 1 therefore can achieve variation and depth of highlights like an actual carbon member and achieve the appearance that resembles an actual carbon member. The carbon decorative panel 1 thus can appropriately ensure the texture of the carbon-toned pattern M.

In the above-described carbon decorative panel 1, the carbon-toned surface 12a includes the unit patterns 12c that constitute a weave of pseudo carbon fiber bundles 12h. The unit patterns 12c include a unit pattern 12c in which the length Q in the extending direction of the linear groove 12d and the depth D of the linear groove 12d vary in a predetermined range. In the carbon decorative panel 1 with this configuration, the length Q and the depth D of the linear groove 12d can be formed at random for each unit pattern 12c. The unit patterns 12c having irregularity that look as if actual carbon fiber bundles are woven by pre-impregnation thus can be formed in the carbon decorative panel 1. The carbon decorative panel 1 therefore can achieve variation and depth of highlights like an actual carbon member and achieve the appearance that resembles an actual carbon member.

In the above-described carbon decorative panel 1, the unit patterns 12c are formed such that the length in the long side direction is 4 mm and the length in the short side direction is 2 mm. The linear grooves 12d are formed such that the length Q in the extending direction of each linear groove 12d is in the range of 1 mm to 4 mm and the depth D of the linear groove 12d is in the range of 0 µm to 3 µm at random. With this configuration, the unit patterns 12c having irregularity that look as if actual carbon fiber bundles are woven by pre-impregnation can be formed in the carbon decorative panel 1. The carbon decorative panel 1 therefore can achieve variation and depth of highlights like an actual carbon member and achieve the appearance that resembles an actual carbon member.

In the above-described carbon decorative panel 1, the linear groove 12d is formed to be depressed from the reference plane P1 of the carbon-toned surface 12a along the depth direction (deepness direction). The depth D of the linear groove 12d is the distance between the reference plane P1 and the bottom portion 12i of the linear groove 12d in the depth direction (deepness direction). In this way, in the carbon decorative panel 1, the depth D of the linear groove 12d is defined relative to the reference plane P1.

The dial plate 100 according to the first embodiment includes the clear decoration 10, the carbon color layer 14, the AG print layer 13, the character display section 16a (design layer 16), and the indicator display section 17a (smoke layer 17). The clear decoration 10 has the body 10a transmitting light and includes the carbon-toned surface 12a provided on the opposite side to the viewer side of the body 10a and having the carbon-toned pattern M. The carbon color layer 14 is colored in the carbon color, is laminated on the carbon-toned surface 12a, and includes the reflective surface 14a reflecting light transmitted through the clear decoration 10. The AG print layer 13 is laminated on the viewer side of the body 10a and suppresses light reflection. The character display section 16a (design layer 16) and the indicator display section 17a (smoke layer 17) are provided on the body 10a and transmit light such that a design related to the vehicle is illuminated. The carbon-toned pattern M is formed with the pseudo carbon fiber bundles 12h presenting carbon fiber bundles formed by bundling carbon fibers in a pseudo manner. The pseudo carbon fiber bundle 12h has the linear grooves 12d that constitute pseudo carbon fibers presenting carbon fibers in a pseudo manner. The carbon-toned surface 12a includes the pseudo carbon fiber bundle 12h in which the length Q in the extending direction of each linear groove 12d and the depth D of the linear groove 12d vary in a predetermined range. With this configuration, the dial plate 100 can achieve the similar effects as the carbon decorative panel 1 described above.

Second Embodiment

Figure 10:
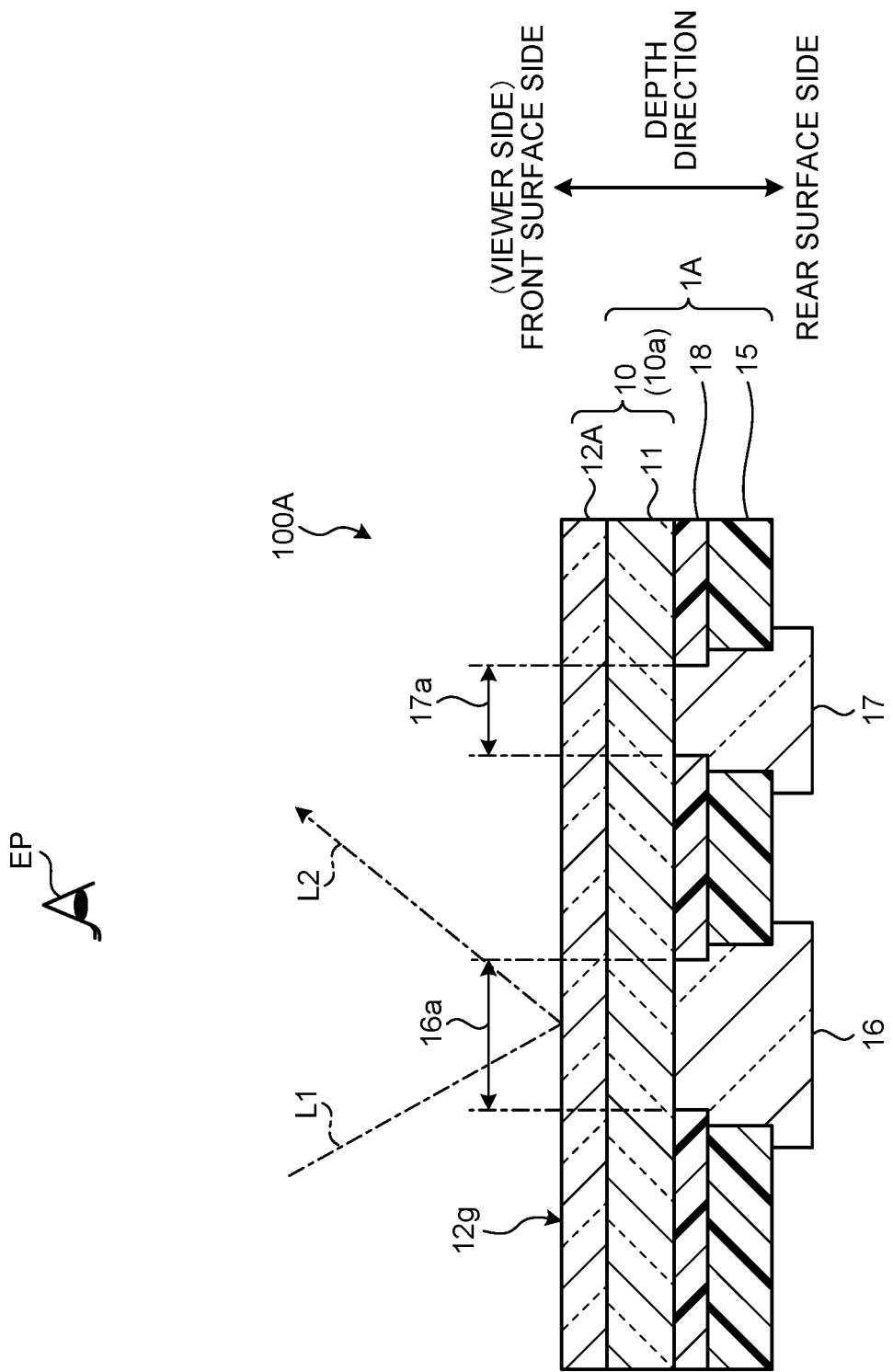
FIG. 10 is a cross-sectional view illustrating a configuration example of the dial plate according to a second embodiment.
Figure 11:
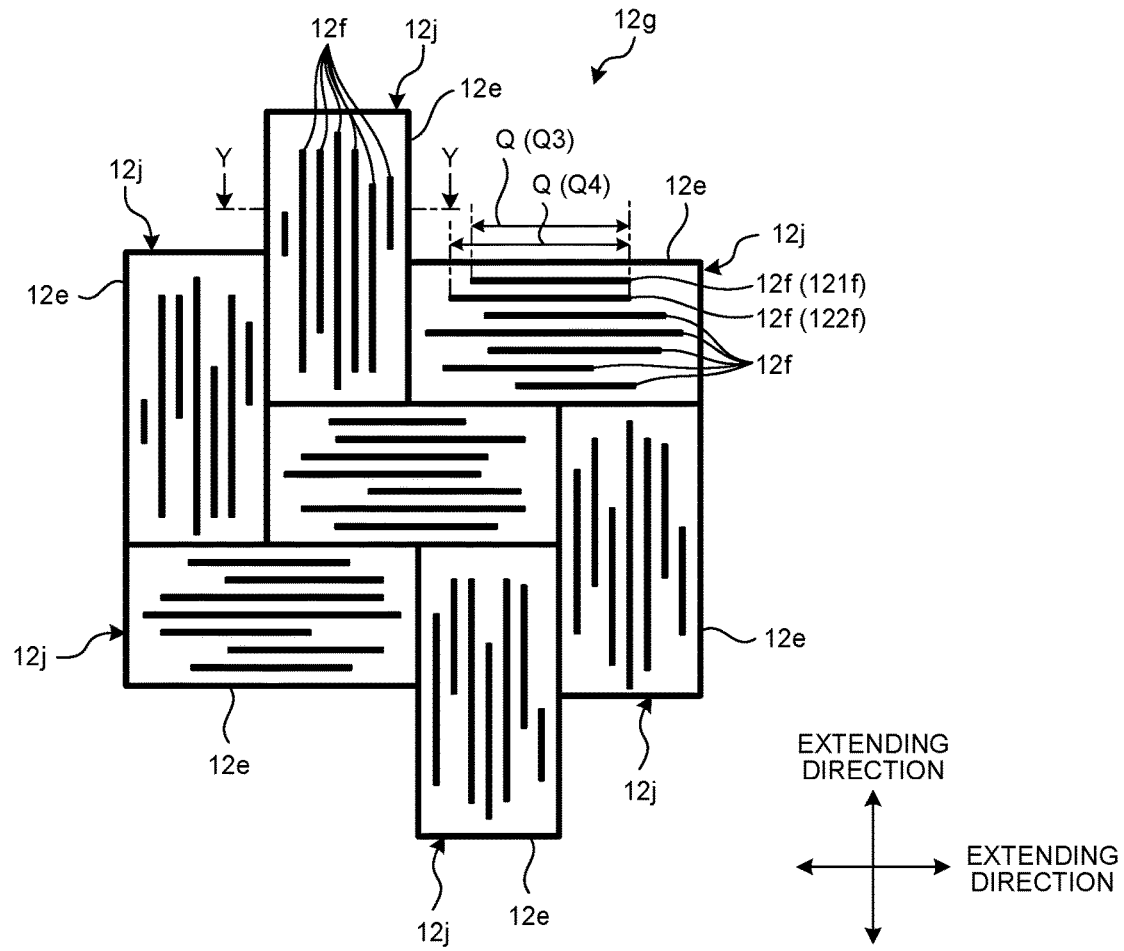
FIG. 11 is a front view illustrating a configuration example of a carbon-toned surface of a clear layer according to the second embodiment.
Figure 12:
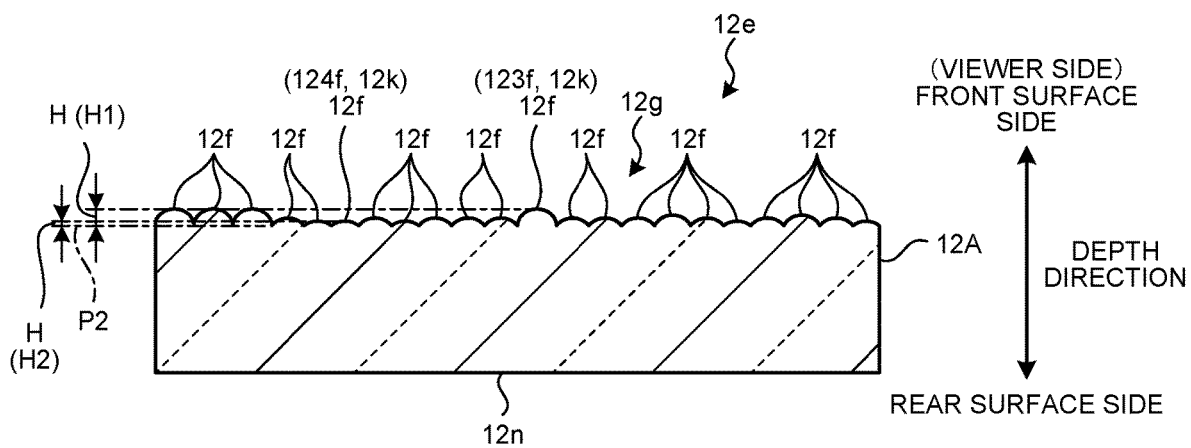
FIG. 12 is a cross-sectional view along Y-Y in FIG. 11.

A second embodiment will now be described. FIG. 10 is a cross-sectional view illustrating a configuration example of a dial plate 100A according to a second embodiment. FIG. 11 is a front view illustrating a configuration example of a carbon-toned surface 12g of a clear layer 12A according to the second embodiment in the exaggerated way. FIG. 12 is a cross-sectional view along Y-Y in FIG. 11. As illustrated in FIG. 10, a carbon decorative panel 1A according to the second embodiment differs from the carbon decorative panel 1 according to the first embodiment in that the carbon-toned surface 12g of the clear layer 12A is provided on the viewer side. In the carbon decorative panel 1A according to the second embodiment, the components equivalent to those in the carbon decorative panel 1 according to the first embodiment are denoted by the same reference signs and a detailed description thereof is omitted.

The carbon decorative panel 1A includes a substrate 11, a colored layer 18 laminated on the rear surface side of the substrate 11 and colored in the carbon color, a clear layer 12A laminated on the front surface side of the substrate 11, and a light-blocking print layer 15.

The clear layer 12A has a carbon-toned pattern M. The clear layer 12A is provided by imprinting on the front surface side of the substrate 11. The clear layer 12A is formed of, for example, a photocurable resin material (ink) that transmits light of wavelengths in the visible light range and is cured when irradiated with UV light. The clear layer 12A includes a carbon-toned surface 12g. The carbon-toned surface 12g is provided on the clear layer 12A on the opposite side (that is, the viewer side) to the substrate 11. The carbon-toned surface 12g has the carbon-toned pattern M formed with a plurality of unit patterns 12e (see FIG. 11). Each unit pattern 12e constitutes a weave of pseudo carbon fiber bundles 12j presenting actual pre-impregnated carbon fiber bundles in a pseudo manner, and each individual pseudo carbon fiber presenting an actual carbon fiber in a pseudo manner is formed.

As illustrated in FIG. 11 and FIG. 12, the pseudo carbon fiber bundle 12j has a plurality of linear protrusions 12f that constitute pseudo carbon fibers presenting actual carbon fibers in a pseudo manner. Each linear protrusion 12f extends along the extending direction of the pseudo carbon fiber bundle 12j. The linear protrusion 12f is formed to protrude along the depth direction (height direction) from the reference plane P2 of the carbon-toned surface 12g. As used herein the reference plane P2 is a virtual plane on the front surface side of the clear layer 12A, for example, a plane parallel to the opposite surface 12n to the carbon-toned surface 12g. The reference plane P2 can be said as a plane orthogonal to the depth direction (layered direction). The reference plane P2 can be said as a plane along the row direction in which the linear protrusions 12f are arranged in a row. The height H of the linear protrusion 12f is the distance between the reference plane P2 and the top portion 12k of the linear protrusion 12f in the depth direction. The carbon-toned surface 12g includes the pseudo carbon fiber bundle 12j in which the length Q in the extending direction of the linear protrusion 12f and the height H of the linear protrusion 12f vary in a predetermined range. Here, it is assumed that the pseudo carbon fiber bundle 12j is a carbon fiber bundle formed by bundling 3000 actual carbon fibers (called 3K carbon fiber bundle).

In the unit patterns 12e that constitute a weave of pseudo carbon fiber bundles 12j, the length Q in the extending direction of the linear protrusion 12f and the height H of the linear protrusion 12f vary for each unit pattern 12e in a predetermined range. In the case of the above-described 3K pseudo carbon fiber bundle 12j, the unit patterns 12e are formed such that the length in the long side direction is 4 mm and the length in the short side direction is 2 mm. In this case, each linear protrusion 12f is formed such that the length Q in the extending direction of the linear protrusion 12f is in the range of 1 mm to 4 mm and the height H in the depth direction of the linear protrusion 12f is in the range of 0 μm to 3 μm at random. As used herein "at random" means that the length Q of the linear protrusion 12f and the height H of the linear protrusion 12f are changed arbitrarily in a predetermined range. As illustrated in FIG. 11, the linear protrusion 12f is formed, for example, such that the length Q3 in the extending direction of a linear protrusion 121f is shorter than the length Q4 in the extending direction of a linear protrusion 122f. As illustrated in FIG. 12, the linear protrusion 12f is formed, for example, such that the height H1 in the depth direction of a linear protrusion 123f is greater than the height H2 in the depth direction of a linear protrusion 124f.

The result of a sensory evaluation test of the carbon decorative panel 1A will now be described. In the sensory evaluation test, as illustrated in FIG. 13, the carbon decorative panels 1A with varied lengths Q of the linear protrusions 12f were prepared. Each carbon decorative panel 1A was evaluated by three evaluators A to C. The linear protrusion 12f has a fixed height H. The length Q of the linear protrusion 12f was set to 4 mm, 10 mm, 40 mm, 5 mm to 10 mm, and 1 mm to 15 mm in the 3K pseudo carbon fiber bundle 12h. Since the length (entire length) in the long side direction of the unit pattern 12e is 4 mm, for example, when the length Q of the linear protrusion 12f is set to 4 mm, one or a plurality of 4-mm linear protrusions 12f are formed. In the unit pattern 12e, when the length Q is set to 10 mm, one or a plurality of sets of two 4-mm linear protrusions 12f and one 2-mm linear protrusion 12f (linear protrusion 12f of a total of 10 mm) are formed. In the unit pattern 12e, when the length Q is set to 5 mm to 10 mm, the linear protrusions 12f having the lengths Q set in the range of 5 mm to 10 mm at random are formed.

In FIG. 13, "x" indicates being not similar to actual carbon, "◯" indicates being similar to actual carbon, and "Δ" indicates being slightly similar to actual carbon. As illustrated in FIG. 13, when the length Q of the linear protrusion 12f is 4 mm, 10 mm, and 40 mm, the evaluators A to C evaluated the panel as being not similar to actual carbon ("x"). When the length Q of the linear protrusion 12f is 5 mm to 10 mm, the evaluator A evaluated the panel as being slightly similar to actual carbon ("Δ"), the evaluator B evaluated the panel as being similar to actual carbon ("◯"), and the evaluator C evaluated the panel as being not similar to actual carbon ("x"). When the length Q of the linear protrusion 12f is 1 mm to 15 mm, the evaluators A to C evaluated the panel as being similar to actual carbon ("◯"). Based on this result, the carbon decorative panel 1A can be evaluated as being most similar to actual carbon when the length Q of the linear protrusion 12f is 1 mm to 15 mm.

As described above, the carbon decorative panel 1A according to the second embodiment includes the clear decoration 10 and the colored layer 18. The clear decoration 10 has the body 10a transmitting light and includes the carbon-toned surface 12g provided on the viewer side of the body 10a and having the carbon-toned pattern M. The colored layer 18 is laminated on the opposite side to the viewer side of the body 10a and is colored in the carbon color. The carbon-toned pattern M is formed with a plurality of pseudo carbon fiber bundles 12j presenting carbon fiber bundles formed by bundling carbon fibers in a pseudo manner. The pseudo carbon fiber bundle 12j has the linear protrusions 12f that constitute pseudo carbon fibers presenting carbon fibers in a pseudo manner. The carbon-toned surface 12g includes the pseudo carbon fiber bundle 12j in which the length Q in the extending direction of each linear protrusion 12f and the height H of the linear protrusion 12f vary in a predetermined range.

In the carbon decorative panel 1A with this configuration, the length Q and the height H of the linear protrusion 12f of the pseudo carbon fiber bundle 12j can be formed at random. The pseudo carbon fiber bundles 12j having irregularity that look as if actual carbon fiber bundles are woven by pre-impregnation thus can be formed in the carbon decorative panel 1A. The carbon decorative panel 1A therefore can achieve variation and depth of highlights like an actual carbon member and achieve the appearance that resembles an actual carbon member. The carbon decorative panel 1A thus can appropriately ensure the texture of the carbon-toned pattern M.

In the above-described carbon decorative panel 1A, the carbon-toned surface 12g includes the unit patterns 12e that constitute a weave of pseudo carbon fiber bundles 12j. The unit patterns 12e include a unit pattern 12e in which the length Q in the extending direction of the linear protrusion 12f and the height H of the linear protrusion 12f vary in a predetermined range. In the carbon decorative panel 1A with this configuration, the length Q and the height H of the linear protrusion 12f can be formed at random for each unit pattern 12e. The unit patterns 12e having irregularity that look as if actual carbon fiber bundles are woven by pre-impregnation thus can be formed in the carbon decorative panel 1A. The carbon decorative panel 1A therefore can achieve variation and depth of highlights like an actual carbon member and achieve the appearance that resembles an actual carbon member.

In the above-described carbon decorative panel 1A, the unit patterns 12e are formed such that the length in the long side direction is 4 mm and the length in the short side direction is 2 mm. The linear protrusions 12f are formed such that the length in the extending direction of each linear protrusion 12f is in the range of 1 mm to 4 mm and the height of the linear protrusion 12f is in the range of 0 μm to 3 μm at random. With this configuration, the unit patterns 12e having irregularity that look as if actual carbon fiber bundles are woven by pre-impregnation can be formed in the carbon decorative panel 1A. The carbon decorative panel 1A therefore can achieve variation and depth of highlights like an actual carbon member and achieve the appearance that resembles an actual carbon member.

In the above-described carbon decorative panel 1A, the linear protrusion 12f is formed to protrude along the depth direction (height direction) from the reference plane P2 of the carbon-toned surface 12g. The height H of the linear protrusion 12f is the distance between the reference plane P2 and the top portion 12k of the linear protrusion 12f in the depth direction (height direction). In this way, in the carbon decorative panel 1A, the height H of the linear protrusion 12f is defined relative to the reference plane P2.

The dial plate 100A according to the second embodiment includes the clear decoration 10, the colored layer 18, the character display section 16a (design layer 16), and the indicator display section 17a (smoke layer 17). The clear decoration 10 has the body 10a provided in a vehicle and transmitting light and includes the carbon-toned surface 12g provided on the viewer side of the body 10a and having the carbon-toned pattern M. The colored layer 18 is laminated on the opposite side to the viewer side of the body 10a and is colored in the carbon color. The character display section 16a (design layer 16) and the indicator display section 17a (smoke layer 17) are provided on the body 10a and transmit light such that a design related to the vehicle is illuminated. The carbon-toned pattern M is formed with the pseudo carbon fiber bundles 12j presenting carbon fiber bundles formed by bundling carbon fibers in a pseudo manner. The pseudo carbon fiber bundle 12j has the linear protrusions 12f that constitute pseudo carbon fibers presenting carbon fibers in a pseudo manner. In the carbon-toned surface 12g, the length Q in the extending direction of each linear protrusion 12f and the depth D of the linear protrusion 12f vary in a predetermined range. With this configuration, the dial plate 100A can achieve the similar effects as the carbon decorative panel 1A described above.

Modifications

Modifications will now be described. In the foregoing description, it is assumed that the pseudo carbon fiber bundles 12h and 12j are 3K carbon fiber bundles. However, embodiments are not limited thereto. For example, 5K which is a bundle of 5000 carbon fibers may be employed.

The carbon decorative panel 1 (1A) is applied to the dial plate 100 (100A) as a decorative part having the carbon-toned pattern M. However, embodiments are not limited thereto and may be applied to a decorative sheet for an instrument panel.

The dial plate 100 described above includes the carbon decorative panel 1, the AG print layer 13, the design layer 16, and the smoke layer 17. However, embodiments are not limited thereto and may have any other configuration.

The dial plate 100A described above includes the carbon decorative panel 1A, the design layer 16, and the smoke layer 17. However, embodiments are not limited thereto and may have any other configuration.

The body 10a of the clear decoration 10 described above includes the substrate 11 and the clear layer 12 formed as separated components by imprinting. However, embodiments are not limited thereto. The body 10a of the clear decoration 10 may be formed, for example, such that the substrate 11 and the clear layer 12 are integrally formed by resin injection molding.

The clear layer 12 and 12A described above are formed on the substrate 11 by UV-curing imprinting. However, embodiments are not limited thereto. For example, thermal-curing imprinting may be used.

The dial plate 100 described above includes the AG print layer 13 as a low reflection layer. However, a member other than the AG print layer 13 may be used to form a low reflection layer.

The AG print layer 13, the carbon color layer 14, the light-blocking print layer 15, the design layer 16, and the smoke layer 17 are formed using a screen printer in the example above. However, embodiments are not limited thereto. For example, they may be formed using an inkjet printer.

In the example described above, the linear groove 12d is formed to be depressed along the depth direction (deepness direction) from the reference plane P1 of the carbon-toned surface 12a. However, embodiments are not limited thereto. A protrusion from the reference plane P1 of the carbon-toned surface 12a along the depth direction (deepness direction) may be formed.

In the example described above, the linear protrusion 12f is formed to protrude along the depth direction (height direction) from the reference plane P2 of carbon-toned surface 12g. However, embodiments are not limited thereto. A depression from the reference plane P2 of the carbon-toned surface 12g along the depth direction (height direction) may be formed.

In the resin decorative part and the dial plate according to the present embodiment, the carbon-toned surface includes the pseudo carbon fiber bundle in which the length in the extending direction of the linear groove and the depth of the linear groove vary in a predetermined range. In the resin decorative part and the dial plate according to the present embodiment, the carbon-toned surface includes the pseudo carbon fiber bundle in which the length in the extending direction of each linear protrusion and the height of the linear protrusion vary in a predetermined range. Accordingly, in the resin decorative part and the dial plate, pseudo carbon fiber bundles having irregularity that look as if actual carbon fiber bundles are woven can be formed, and the texture of the carbon decorative part can be appropriately ensured.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A resin decorative part comprising:
   a clear decoration having a body transmitting light, the clear decoration including a carbon-toned surface disposed on an opposite side to a viewer side of the body and having a carbon-toned pattern; and
   a carbon color layer colored in a carbon color and laminated on the carbon-toned surface, the carbon color layer having a reflective surface reflecting light transmitted through the clear decoration, wherein
   the carbon-toned pattern is formed with a plurality of pseudo carbon fiber bundles presenting carbon fiber bundles formed by bundling carbon fibers in a pseudo manner,
   the pseudo carbon fiber bundle has a plurality of linear grooves that constitute pseudo carbon fibers presenting the carbon fibers in a pseudo manner, and
   the carbon-toned surface includes the pseudo carbon fiber bundle in which a length in an extending direction of each linear groove and a depth of the linear groove vary in a predetermined range.

2. The resin decorative part according to claim 1, wherein
the carbon-toned surface includes a plurality of unit patterns that constitute a weave of the pseudo carbon fiber bundles, and
the unit patterns include the unit pattern in which a length in an extending direction of each linear groove and a depth of the linear groove vary in a predetermined range.

3. The resin decorative part according to claim 2, wherein
the unit patterns are formed such that a length in a long side direction is 4 mm and a length in a short side direction is 2 mm, and
the linear grooves are formed such that a length in an extending direction of each linear groove is in a range of 1 mm to 4 mm and a depth of the linear groove is in a range of 0 µm to 3 µm at random.

4. The resin decorative part according to claim 3, wherein
the linear groove is formed to be depressed from a reference plane of the carbon-toned surface along a deepness direction, and
a depth of the linear groove is a distance between the reference plane and a bottom portion of the linear groove in the deepness direction.

5. The resin decorative part according to claim 2, wherein
the linear groove is formed to be depressed from a reference plane of the carbon-toned surface along a deepness direction, and
a depth of the linear groove is a distance between the reference plane and a bottom portion of the linear groove in the deepness direction.

6. The resin decorative part according to claim 1, wherein
the linear groove is formed to be depressed from a reference plane of the carbon-toned surface along a deepness direction, and
a depth of the linear groove is a distance between the reference plane and a bottom portion of the linear groove in the deepness direction.

7. A dial plate comprising:
a clear decoration having a body disposed in a vehicle and transmitting light, the clear decoration including a carbon-toned surface disposed on an opposite side to a viewer side of the body and having a carbon-toned pattern;
a carbon color layer colored in a carbon color, laminated on the carbon-toned surface, and including a reflective surface reflecting light transmitted through the clear decoration;
a low reflection layer laminated on the viewer side of the body to suppress reflection of light; and
a design display section disposed on the body and transmitting light such that a design related to the vehicle is illuminated, wherein
the carbon-toned pattern is formed with a plurality of pseudo carbon fiber bundles presenting carbon fiber bundles formed by bundling carbon fibers in a pseudo manner,
the pseudo carbon fiber bundle has a plurality of linear grooves that constitute pseudo carbon fibers presenting the carbon fibers in a pseudo manner, and
the carbon-toned surface includes the pseudo carbon fiber bundle in which a length in an extending direction of each linear groove and a depth of the linear groove vary in a predetermined range.

8. A resin decorative part comprising:
a clear decoration having a body transmitting light, the clear decoration including a carbon-toned surface disposed on a viewer side of the body and having a carbon-toned pattern; and
a colored layer laminated on an opposite side to the viewer side of the body and colored in a carbon color, wherein
the carbon-toned pattern is formed with a plurality of pseudo carbon fiber bundles presenting carbon fiber bundles formed by bundling carbon fibers in a pseudo manner,
the pseudo carbon fiber bundle has a plurality of linear protrusions that constitute pseudo carbon fibers presenting the carbon fibers in a pseudo manner, and
the carbon-toned surface includes the pseudo carbon fiber bundle in which a length in an extending direction of each linear protrusion and a height of the linear protrusion vary in a predetermined range.

9. The resin decorative part according to claim 8, wherein
the carbon-toned surface includes a plurality of unit patterns that constitute a weave of the pseudo carbon fiber bundles, and
the unit patterns include the unit pattern in which a length in an extending direction of each linear protrusion and a height of the linear protrusion vary in a predetermined range.

10. The resin decorative part according to claim 9, wherein
the unit patterns are formed such that a length in a long side direction is 4 mm and a length in a short side direction is 2 mm, and
the linear protrusions are formed such that a length in an extending direction of each linear protrusion is in a range of 1 mm to 4 mm and a height of the linear protrusion is in a range of 0 µm to 3 µm at random.

11. The resin decorative part according to claim 10, wherein
the linear protrusion is formed to protrude along a height direction from a reference plane of the carbon-toned surface, and
a height of the linear protrusion is a distance between the reference plane and a top portion of the linear protrusion in the height direction.

12. The resin decorative part according to claim 9, wherein
the linear protrusion is formed to protrude along a height direction from a reference plane of the carbon-toned surface, and
a height of the linear protrusion is a distance between the reference plane and a top portion of the linear protrusion in the height direction.

13. The resin decorative part according to claim 8, wherein
the linear protrusion is formed to protrude along a height direction from a reference plane of the carbon-toned surface, and
a height of the linear protrusion is a distance between the reference plane and a top portion of the linear protrusion in the height direction.

14. A dial plate comprising:
a clear decoration having a body disposed in a vehicle and transmitting light, the clear decoration including a carbon-toned surface disposed on a viewer side of the body and having a carbon-toned pattern;
a colored layer laminated on an opposite side to the viewer side of the body and colored in a carbon color; and a design display section disposed on the body and transmitting light such that a design related to the vehicle is illuminated, wherein the carbon-toned pattern is formed with a plurality of pseudo carbon fiber bundles presenting carbon fiber bundles formed by bundling carbon fibers in a pseudo manner, the pseudo carbon fiber bundle has a plurality of linear protrusions that constitute pseudo carbon fibers presenting the carbon fibers in a pseudo manner, and the carbon-toned surface includes the pseudo carbon fiber bundle in which a length in an extending direction of each linear protrusion and a height of the linear protrusion vary in a predetermined range.

\* \* \* \* \*